US011435187B2

(12) United States Patent
Kim et al.

(10) Patent No.: US 11,435,187 B2
(45) Date of Patent: Sep. 6, 2022

(54) METHOD FOR CALIBRATING SENSOR OR AZIMUTH INFORMATION OBTAINED THROUGH SENSOR, BASED ON AZIMUTH INFORMATION OBTAINED USING SATELLITE POSITIONING CIRCUIT, AND ELECTRONIC DEVICE SUPPORTING THE SAME

(71) Applicant: Samsung Electronics Co., Ltd., Gyeonggi-do (KR)

(72) Inventors: Jinik Kim, Gyeonggi-do (KR); Gongbo Moon, Gyeonggi-do (KR); Namjoon Park, Gyeonggi-do (KR); Jeongmin Park, Gyeonggi-do (KR)

(73) Assignee: Samsung Electronics Co., Ltd

( * ) Notice: Subject to any disclaimer, the term of this patent is extended or adjusted under 35 U.S.C. 154(b) by 528 days.

(21) Appl. No.: 16/521,091

(22) Filed: Jul. 24, 2019

(65) Prior Publication Data
US 2020/0033130 A1    Jan. 30, 2020

(30) Foreign Application Priority Data

Jul. 24, 2018    (KR) ........................ 10-2018-0086040

(51) Int. Cl.
*G01C 21/18*    (2006.01)
*G01S 19/47*    (2010.01)
(Continued)

(52) U.S. Cl.
CPC ......... *G01C 21/18* (2013.01); *G01C 19/5614* (2013.01); *G01C 21/005* (2013.01); *G01S 19/47* (2013.01); *G01S 19/14* (2013.01)

(58) Field of Classification Search
None
See application file for complete search history.

(56) References Cited

U.S. PATENT DOCUMENTS 5,617,317 A * 4/1997 Ignagni ................ G01C 21/165
                                              342/357.31
5,657,232 A * 8/1997 Ishikawa ................ G01S 11/10
                                              340/988

(Continued)

FOREIGN PATENT DOCUMENTS

JP    2012-202780    10/2012
KR    10-2006-0102016    9/2006

OTHER PUBLICATIONS

European Search Report dated Jun. 17, 2021 issued in counterpart application No. 19840907.0-1206, 8 pages.

(Continued)

*Primary Examiner* — Paul M. West
*Assistant Examiner* — Mark A Shabman
(74) *Attorney, Agent, or Firm* — The Farrell Law Firm, P.C.

(57) ABSTRACT

An electronic device and a method of an electronic device are provided. The electronic device includes a satellite positioning circuit, at least one sensor for sensing an azimuth or movement of the electronic device, and a processor configured to identify the movement of the electronic device by using a plurality of location information received through the satellite positioning circuit, identify first azimuth information corresponding to the movement of the electronic device, based at least on determining that the movement of the electronic device corresponds to a designated movement, and calibrate second azimuth information obtained using the at least one sensor, based at least on the first azimuth information.

19 Claims, 15 Drawing Sheets

(51) Int. Cl.
*G01C 21/00* (2006.01)
*G01C 19/5614* (2012.01)
*G01S 19/14* (2010.01)

(56) References Cited

U.S. PATENT DOCUMENTS

| | | | |
|---|---|---|---|
| 2006/0195254 A1* | 8/2006 | Ladetto | G01C 17/00 |
| | | | 701/508 |
| 2009/0171607 A1 | 7/2009 | Chen et al. | |
| 2011/0275408 A1* | 11/2011 | Kulik | G01C 17/38 |
| | | | 455/556.1 |
| 2012/0173140 A1 | 7/2012 | Czompo et al. | |
| 2016/0245716 A1 | 8/2016 | Gum et al. | |
| 2017/0010936 A1 | 1/2017 | Daoud et al. | |
| 2017/0026800 A1 | 1/2017 | Kim et al. | |
| 2017/0347239 A1 | 11/2017 | MacGougan et al. | |

OTHER PUBLICATIONS

International Search Report dated Oct. 30, 2019 issued in counterpart application No. PCT/KR2019/009169, 8 pages.

* cited by examiner

METHOD FOR CALIBRATING SENSOR OR AZIMUTH INFORMATION OBTAINED THROUGH SENSOR, BASED ON AZIMUTH INFORMATION OBTAINED USING SATELLITE POSITIONING CIRCUIT, AND ELECTRONIC DEVICE SUPPORTING THE SAME

CROSS-REFERENCE TO RELATED APPLICATION(S)

This application is based on and claims priority under 35 U.S.C. § 119 to Korean Patent Application No. 10-2018-0086040, filed on Jul. 24, 2018, in the Korean Intellectual Property Office, the disclosure of which is incorporated by reference herein in its entirety.

BACKGROUND

1. Field

The present disclosure relates to a method for calibrating sensing data in an electronic device and an electronic device supporting the same.

2. Description of Related Art

An electronic device may use an acceleration sensor, a gyroscope, etc. for measuring an azimuth of the electronic device. The acceleration sensor and the gyroscope may measure acceleration and angular acceleration working with a criterion of each axis. Through the measured acceleration and angular acceleration, the electronic device may measure a posture of the electronic device. The electronic device may receive a signal from a satellite, to identify a location of the electronic device.

In the acceleration sensor and gyroscope of the electronic device, as time progresses, a drift phenomenon may take place due to the accumulation of sensor errors. The drift phenomenon may work as a big error factor in determining an azimuth of the electronic device. A way to calibrate an increase of errors dependent on time is needed.

SUMMARY

The present disclosure is not limited to the technological solutions disclosed herein, and other technological solutions not mentioned herein would be able to be clearly understood by a person having ordinary skill in the art from the following disclosure.

In accordance with an aspect of the present disclosure, an electronic device is provided. The electronic device includes a satellite positioning circuit, at least one sensor for sensing an azimuth or movement of the electronic device, and a processor, wherein the processor is configured to identify the movement of the electronic device by using a plurality of location information received through the satellite positioning circuit, identify first azimuth information corresponding to the movement of the electronic device, based at least on determining that the movement of the electronic device corresponds to a designated movement, and calibrate second azimuth information obtained using the at least one sensor, based at least on the first azimuth information.

In accordance with another aspect of the present disclosure, an electronic device is provided. The electronic device includes a satellite positioning circuit, at least one sensor configured to sense an azimuth or movement of the electronic device, and a processor, wherein the processor is configured to identify the movement of the electronic device by using a plurality of location information received through the satellite positioning circuit, identify first azimuth information corresponding to the movement of the electronic device, based at least on determining that the movement of the electronic device corresponds to a designated movement, and calibrate the at least one sensor, based at least on the first azimuth information.

In accordance with another aspect of the present disclosure, a method of an electronic device is provided. The method includes identifying a movement of the electronic device by using a plurality of location information received through a satellite positioning circuit of the electronic device; identifying first azimuth information corresponding to the movement of the electronic device, based at least on determining that the movement of the electronic device corresponds to a designated movement; and calibrating second azimuth information obtained using at least one sensor for sensing an azimuth or movement of the electronic device or the at least one sensor, based at least on the first azimuth information.

BRIEF DESCRIPTION OF THE DRAWINGS

The above and other aspects, features, and advantages of certain embodiments of the present disclosure will be more apparent from the following description, taken in conjunction with the accompanying drawings, in which.

DETAILED DESCRIPTION

Figure 1:
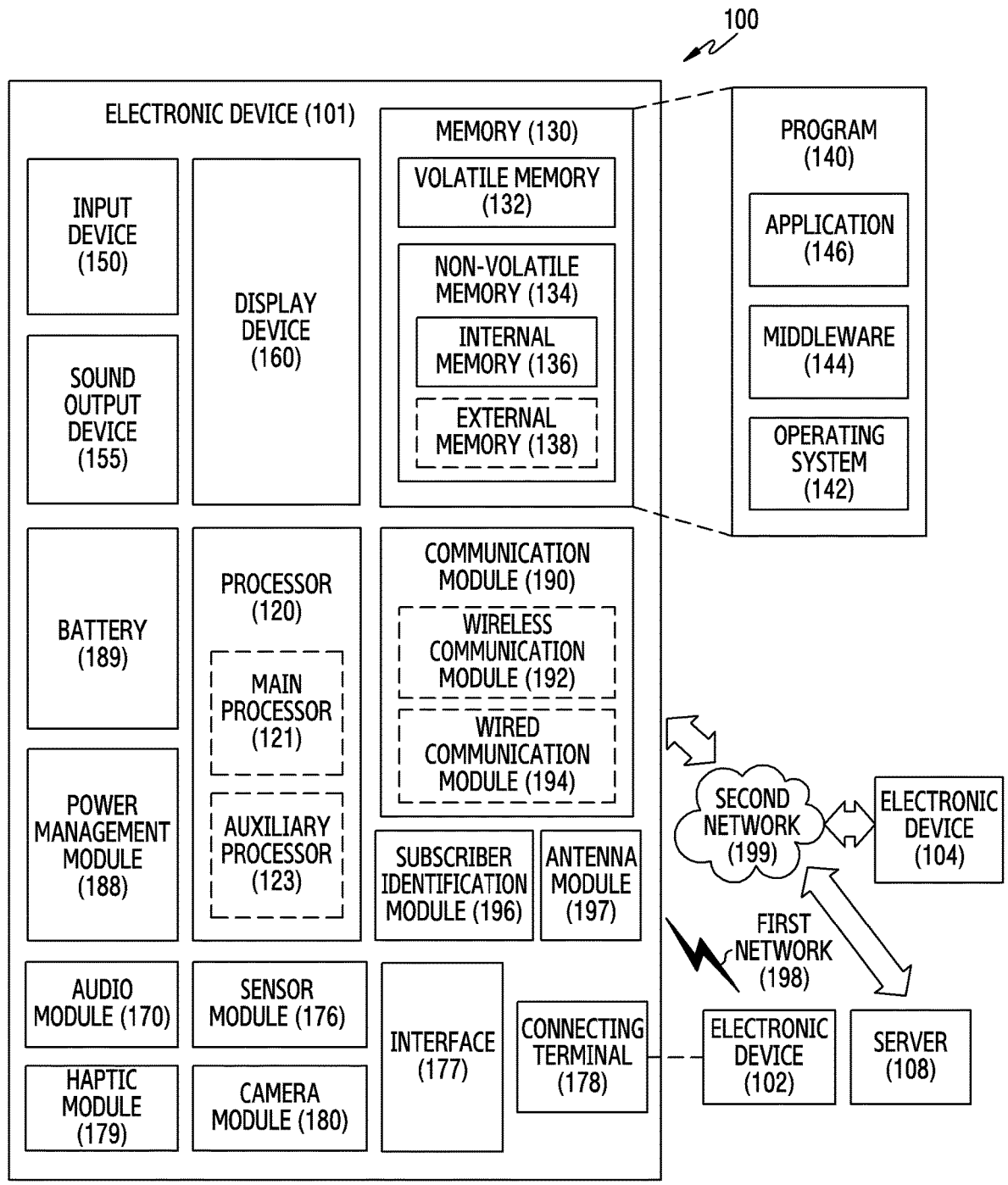
FIG. 1 is a block diagram of an electronic device within a network environment according to an embodiment.

FIG. 1 is a block diagram of an electronic device 101 in a network environment 100 according to an embodiment.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 may include a processor 120, memory 130, an input device 150, a sound output device 155, a display device 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. At least one (e.g., the display device 160 or the camera module 180) of the components may be omitted from the electronic device 101, or one or more other components may be added in the electronic device 101. Some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. As at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of, the main processor 121.

The auxiliary processor 123 may control at least some functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). The auxiliary processor 123 (e.g., an ISP or a CP) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming call. The receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include, for example, a high definition multimedia interface (HDMI), a universal serial bus (USB) interface, a secure digital (SD) card interface, or an audio interface.

The connecting terminal 178 may include a connector via which the electronic device 101 may be physically connected with the external electronic device (e.g., the electronic device 102). The connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of, for example, a power management integrated circuit (PMIC).

The battery 189 may supply power to at least one component of the electronic device 101. The battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the electronic device 102, the electronic device 104, or the server 108, and performing communication via the established communication channel. The communication module 190 may include one or more communication processors that are operable independently from the processor 120 (e.g., the AP) and supports a direct (e.g., wired) communication or a wireless communication. The communication module 190 may include a wireless communication module 192 (e.g., a cellular communication module, a short-range wireless communication module, or a GNSS communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or by a standard of the Infrared Data Association (IrDA)) or the second network 199 (e.g., a long-range communication network, such as a cellular network, the Internet, or a computer network (e.g., LAN or wide area network (WAN)). These various types of communication modules may be implemented as a single component (e.g., a single integrated circuit (IC) or chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. The antenna module 197 may include an antenna including a radiating element composed of a conductive material or a conductive pattern formed in or on a substrate (e.g., a printed circuit board (PCB)). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), a serial peripheral interface (SPI), or a mobile industry processor interface (MIPI)).

Commands or data may be transmitted or received between the electronic device 101 and the external electronic device 104 via the server 108 coupled with the second network 199. Each of the electronic devices 102 and 104 may be a device of a same type as, or a different type, from the electronic device 101. All or some of operations to be executed at the electronic device 101 may be executed at one or more of the electronic device 102, the electronic device 104, or the server 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of performing the at least part of the function or the service requested to the electronic device 101. The electronic device 101 may provide the outcome, with or without further processing of the outcome, as at least part of a reply to the request. To that end, a cloud computing, distributed computing, or client-server computing technology may be used, for example.

The electronic device may be one of various types of electronic devices. The electronic devices may include, for example, a portable communication device (e.g., a smartphone), a computer, a portable multimedia device, a portable medical device, a camera, a wearable device, or a home appliance. However, the electronic devices are not intended to be limited to those described above.

It should be appreciated that various embodiments and the terms used therein are not intended to limit the technological features set forth herein to particular embodiments but are intended to include various changes, equivalents, or replacements for a corresponding embodiment. With regard to the description of the accompanying drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st," "2nd," "first," and "second" may be used to simply distinguish a corresponding component from another component, but does not limit the components in another aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may be used interchangeably with other terms, for example, "logic," "logic block," "part," or "circuitry". The term "module" may indicate a single integral component, or a minimum unit or part thereof, adapted to perform one or more functions. For example, the term "module" may indicate a component that may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply indicates that the storage medium is a tangible device, and does not include a signal (e.g., an electromagnetic wave), but this term does not differentiate between where data is semi-permanently stored in the storage medium and where the data is temporarily stored in the storage medium.

A method according to an embodiment of the present disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

Each component (e.g., a module or a program) of the above-described components may include a single entity or multiple entities. One or more of the above-described components may be omitted, or one or more other components may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Figure 2:
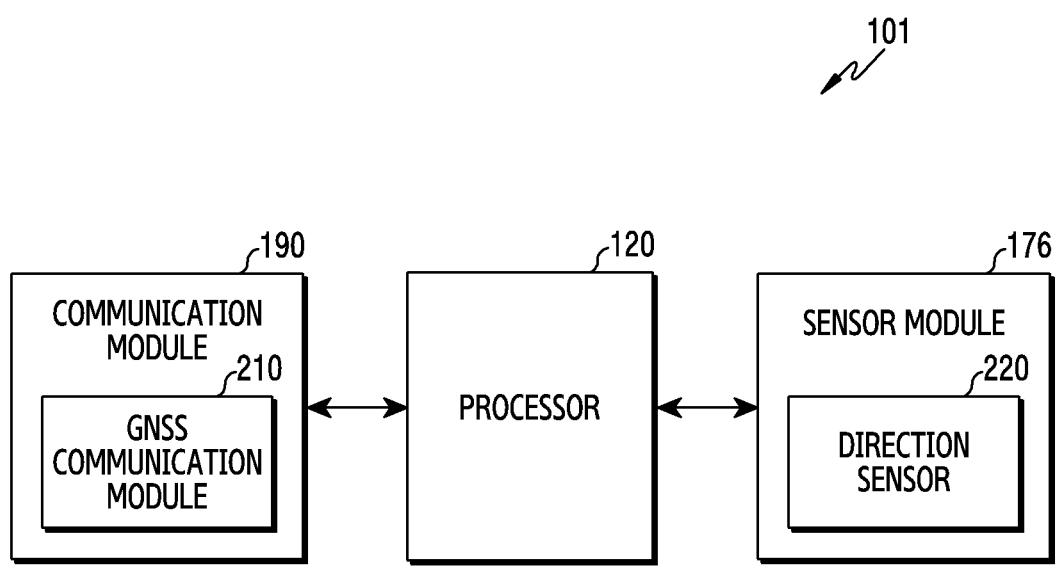
FIG. 2 is a block diagram of an electronic device for calibrating a sensor of the electronic device and sensing data thereof according to an embodiment.

FIG. 2 is a block diagram of the electronic device 101 for calibrating a sensor of the electronic device 101 and second azimuth information thereof according to an embodiment.

At least part of the functional construction illustrated in FIG. 2 may be included in the electronic device 101 illustrated in FIG. 1.

Referring to FIG. 2, the electronic device 101 may include the processor 120, the sensor module 176, and the communication module 190. However, the present disclosure is not intended to be limited to this, and some elements may be omitted.

The communication module 190 may include a GNSS communication module 210. The GNSS communication module 210 may transmit and/or receive a GNSS signal. In accordance with a use area, a bandwidth or the like, GNSS may include at least one of, for example, a global positioning system (GPS), a global navigation satellite system (Glonass), a Beidou navigation satellite system (Beidou), a quasi-zenith satellite system (QZSS), an Indian regional satellite system (IRNSS), or the European global satellite-based navigation system (Galileo). Below, in the present disclosure, "GPS" may be used interchangeably with "GNSS". The GNSS communication module 210 may receive satellite signal information (e.g., a pseudo random number (PRN) code or Doppler information) from a plurality of satellites. The GNSS communication module 210 may use an L1 band (e.g., about 1574 to 1576 MHz) or an L5 band (e.g., about 1166 to 1187 MHz), respectively or simultaneously. In response to the GNSS communication module 210 simultaneously using the L1 band or the L5 band, more precise location of the electronic device 101 may be received from the GNSS communication module 210 than in response to using only the L1 band. The GNSS communication module 210 may receive calibrated data from a fixed base station by using real time kinematics (RTI)—GNSS.

The sensor module 176 may include, for example, a direction sensor 220. The direction sensor 220 may sense an azimuth of the electronic device 101 or the conversion of the azimuth. The direction sensor 220 may include an acceleration sensor, a gyroscope, a barometer, or a geomagnetic sensor.

For example, the acceleration sensor may measure acceleration working with a criterion of each axis of the electronic device 101. The direction sensor 220 may measure a force applied to the electronic device 101 through the measured acceleration.

For example, the gyroscope may measure an angular velocity working with a criterion of each axis of the electronic device 101. The direction sensor 220 may measure a rotating amount by each axis of the electronic device 101 through the measured angular velocity.

For example, the geomagnetic sensor may sense the magnetic north. The direction sensor 220 may measure an azimuth of the electronic device 101 through the magnetic north.

For example, the barometer may sense a barometric pressure around the electronic device 101. The direction sensor 220 may measure an altitude of the electronic device 101, based on the barometric pressure around the electronic device 101.

An azimuth of the electronic device 101 may correspond to a direction which a first point of the electronic device 101 faces.

The processor 120 may control, for example, a general operation of the electronic device 101. To control the general operation of the electronic device 101, the processor 120 may be operatively coupled with other elements within the electronic device 101 such as the sensor module 176 or the communication module 190. The processor 120 may receive commands of other elements (e.g., the sensor module 176 or the communication module 190). The processor 120 may interpret the received commands. The processor 120 may perform a determination according to the interpreted command, and may process data. The processor 120 may be implemented as software, hardware such as a chip, a circuitry, etc., and as a combination of software and hardware. The processor 120 may be one or a plurality of processors.

The processor 120 may interpret a message, data, an instruction or a signal that is received from the sensor module 176 or the communication module 190. The processor 120 may process the message, data, the instruction or the signal that is received from the sensor module 176 or the communication module 190. The processor 120 may generate a new message, data, instruction, or signal, based on the received message, data, instruction or signal. The processor 120 may provide the processed or generated message, data, instruction or signal to the sensor module 176 or the communication module 190.

The processor 120 may identify the movement of the electronic device 101 by using a plurality of location information received through the GNSS communication module 210. The plurality of location information may include location information received at a certain interval of time (e.g., about one second). The processor 120 may determine whether the electronic device 101 moves, based on a location or velocity of the electronic device 101.

At least on the basis of determining that the movement of the electronic device 101 corresponds to a certain movement, the processor 120 may identify first azimuth information corresponding to the movement. The processor 120 may determine whether the electronic device 101 moves at a certain velocity or more, a moving direction is constant, and/or a move path of the electronic device 101 is maintained for a certain time. The processor 120 may determine whether the movement of the electronic device 101 corresponds to the certain movement. The certain movement may include a straight line or a curved line. In response to the movement of the electronic device 101 corresponding to the certain movement, the processor 120 may model the movement of the electronic device 101. In response to modeling the movement of the electronic device 101, the processor 120 may estimate a location or direction of the electronic device 101 after a certain time (e.g., about one second). The first azimuth information may be obtained based on information about a location of the electronic device 101 received through the GNSS communication module 210. The first azimuth information may include a direction which a first point of the electronic device 101 faces. The first azimuth information may include a direction which a user of the electronic device 101 faces.

The processor 120 may calibrate second azimuth information that is obtained using at least one sensor of the electronic device 101, based at least on first azimuth information. The at least one sensor may include the direction sensor 220. The processor 120 may obtain information about a posture of the electronic device 101, by using information received from the direction sensor 220. For example, the processor 120 may determine a game rotation vector (GRV) by using information received from the acceleration sensor or gyroscope of the direction sensor 220. The processor 120 may obtain the information about the posture of the electronic device, based on the GRV. For another example, the processor 120 may determine a rotation vector (RV) by using information received from the acceleration sensor, gyroscope and geomagnetic sensor of the direction sensor 220. The processor 120 may obtain the information about the posture of the electronic device 101, based on the RV. The processor 120 may identify the information about the posture of the electronic device 101 by using Euler angular variation rate and angular velocity. The processor 120 may identify the information about the posture of the electronic device 101 through acceleration and gravity acceleration measured through the acceleration sensor as well. The processor 120 may obtain the second azimuth information, based on the information about the posture of the electronic device 101. The second azimuth information may include an error with a criterion of an actual azimuth of the electronic device 101. The processor 120 may calibrate the second azimuth information, based on the first azimuth information. The processor 120 may calibrate at least one sensor (e.g., the direction sensor 220), based on the first azimuth information.

Figure 3:
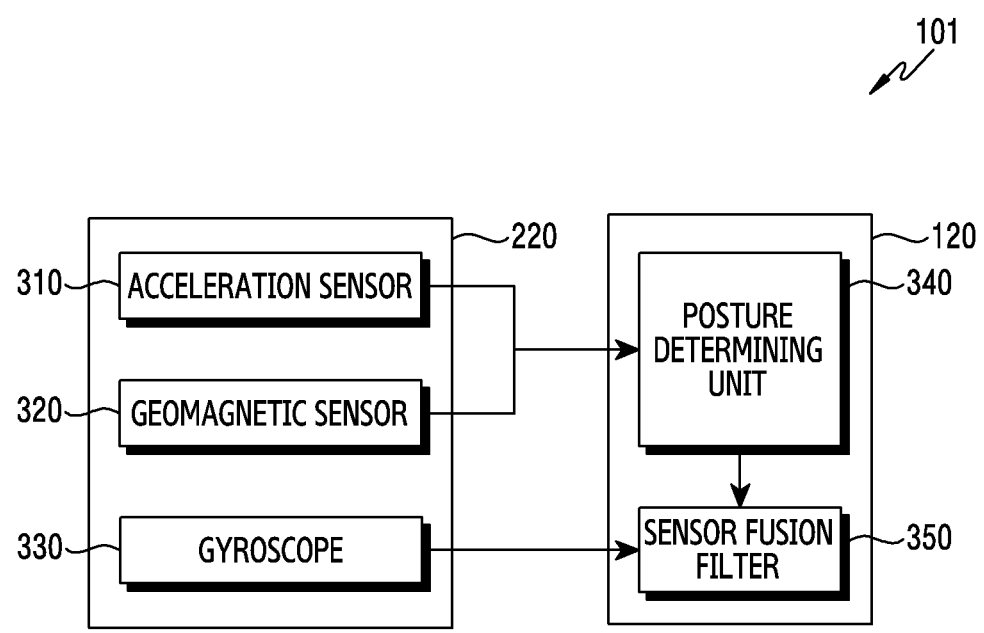
FIG. 3 is a block diagram of an electronic device for identifying a posture of the electronic device according to an embodiment.

FIG. 3 is a block diagram of the electronic device 101 for identifying a posture of the electronic device 101 according to an embodiment.

Referring to FIG. 3, the direction sensor 220 may include an acceleration sensor 310, a geomagnetic sensor 320 or a gyroscope 330. The processor 120 may include a posture determining unit 340 or a sensor fusion filter 350.

The direction sensor 220 may be classified into an integral type sensor and a simultaneous type sensor. The integral type sensor may correspond to a sensor for accumulating several data to determine a value. The simultaneous type sensor may correspond to a sensor for measuring a value at one time. The acceleration sensor 310 and the geomagnetic sensor 320 may be classified as the simultaneous type sensors. The gyroscope 330 may be classified as the integral type sensor. The gyroscope 330 may sense an accurate posture change of the electronic device 101 in a short term. In the gyroscope 330, a drift error can be generated because errors are accumulated as time goes.

The posture determining unit 340 may receive a signal that includes information measured through the acceleration sensor 310 and the geomagnetic sensor 320. The information measured through the acceleration sensor 310 and the geomagnetic sensor 320 may include information about acceleration working at each axis of the electronic device 101 or information about an azimuth of the electronic device 101. The posture determining unit 340 may primarily determine a posture of the electronic device 101, based on the received information.

The sensor fusion filter 350 may receive information about a posture of the electronic device 101 from the posture determining unit 340 and the gyroscope 330. The sensor fusion filter 350 may complement values measured through the respective sensors, to identify the posture of the electronic device 101. For example, the sensor fusion filter 350 may, in a short term, put more weight on a posture of the electronic device 101 identified through the gyroscope 330 than on a posture of the electronic device 101 identified through the acceleration sensor 310 and the geomagnetic sensor 320 to determine the posture of the electronic device 101. For example, the sensor fusion filter 350 may, in a long term, put more weight on the posture of the electronic device 101 identified through the acceleration sensor 310 and the geomagnetic sensor 320 than on the posture of the electronic device 101 identified through the gyroscope 330 to determine the posture of the electronic device 101. The sensor fusion filter 350 may represent the posture of the electronic device 101 through roll, pitch, and yaw values.

The processor 120 may identify second azimuth information of the electronic device 101, based on a posture of the electronic device 101. The identified second azimuth information of the electronic device 101 may be azimuth information whose accuracy is low due to a sensor error. The processor 120 may identify first azimuth information of the electronic device 101, based on information received from the GNSS communication module 210. The processor 120 may calibrate the second azimuth information, based on the first azimuth information identified from the GNSS communication module 210. The processor 120 may calibrate the direction sensor 220, based on the first azimuth information identified from the GNSS communication module 210. The operation of calibrating the direction sensor 220 may correspond to an operation of calibrating a reference value of the direction sensor 220.

According to an embodiment, an electronic device includes a satellite positioning circuit, at least one sensor for sensing an azimuth or movement of the electronic device, and a processor, where the processor may be configured to identify the movement of the electronic device by using a plurality of location information received through the satellite positioning circuit, and identify first azimuth information corresponding to the movement of the electronic device, based at least on determining that the movement of the electronic device corresponds to a designated movement, and calibrate second azimuth information obtained using the at least one sensor, based at least on the first azimuth information.

The processor may be further configured to identify whether a velocity of the movement of the electronic device is greater than or equal to a designated velocity.

The designated velocity may be identified based on a frequency that is used through the satellite positioning circuit.

The processor may be further configured to provide content, based on the calibrated second azimuth information.

The processor may be further configured to identify whether the electronic device is in a fixed state.

The processor may be configured to obtain a plurality of vectors, based on the plurality of location information received through the satellite positioning circuit, and identify the first azimuth information, based on a mean or dispersion of the plurality of vectors.

The at least one sensor may include at least one of an acceleration sensor, a gyroscope, a barometer, or a geomagnetic sensor.

The given movement may include a straight line or curved line satisfying a given movement variation amount. For example, in response to it being identified to execute a rectilinear motion within a certain direction range, it may be identified to correspond to the given movement. For example, in response to it being identified to execute a curvilinear motion (or rotation) within a certain angular velocity, it may be identified to correspond to the designated movement.

The processor may be configured to, in response to it being identified that the movement of the electronic device executes a rectilinear motion within a certain direction range, identify that the movement of the electronic device corresponds to the designated movement.

The processor may be configured to, in response to it being identified that the movement of the electronic device executes a curvilinear motion within a certain angular velocity, identify that the movement of the electronic device corresponds to the designated movement.

The processor may be further configured to provide content corresponding to the second azimuth information.

According to an embodiment, an electronic device includes a satellite positioning circuit, at least one sensor for sensing an azimuth or movement of the electronic device, and a processor, where the processor may be configured to identify the movement of the electronic device by using a plurality of location information received through the satellite positioning circuit, and identify first azimuth information corresponding to the movement of the electronic device, based at least on determining that the movement of the electronic device corresponds to a designated movement, and calibrate the at least one sensor, based at least on the first azimuth information.

The processor may be configured to obtain a plurality of vectors, based on the plurality of location information received through the satellite positioning circuit, and identify the first azimuth information, based on a mean or dispersion of the plurality of vectors.

The processor may be configured to identify second azimuth information which is obtained using the calibrated at least one sensor in a state in which the at least one sensor is calibrated, and provide content corresponding to the second azimuth information.

The processor may be configured to obtain information about a move path of the electronic device by using the satellite positioning circuit, and in response to identifying that the move path is maintained during a designated time and then identifying, by using the at least one sensor, that a posture of the electronic device is changed from a first posture within a designated period of time, recognizing the posture of the electronic device changed from the first posture as a second posture, and provide first content corresponding to the second posture, and in response to identifying that the move path is changed during the designated time and then identifying, by using the at least one sensor, that the posture of the electronic device is changed from the first posture within the designated period of time, recognizing the posture of the electronic device changed from the first posture as a third posture distinguished from the second posture, and providing second content corresponding to the third posture.

The processor may be configured to identify a first subject in the second posture, and provide the first content corresponding to the first subject, and may be configured to identify a second subject in the third posture, and provide the second content corresponding to the second subject.

Figure 4:
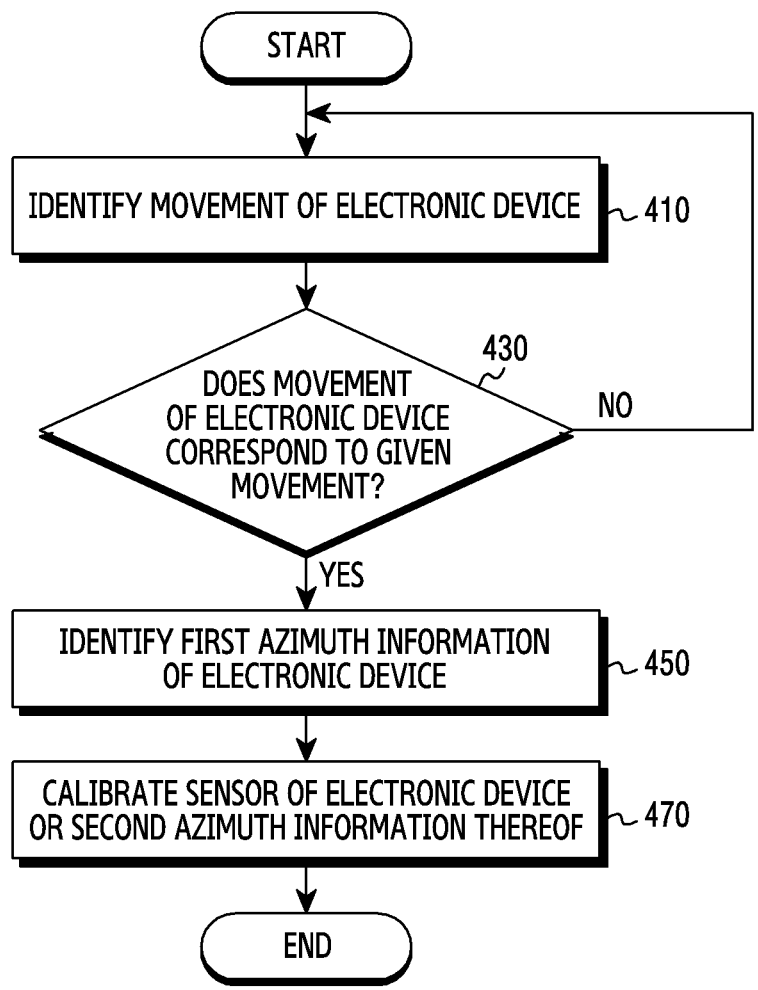
FIG. 4 is a flowchart of a method of an electronic device according to an embodiment.

FIG. 4 is a flowchart of a method of the electronic device 101 according to an embodiment.

Referring to FIG. 4, in step 410, the processor 120 of the electronic device 101 may identify the movement of the electronic device 101. The processor 120 may identify the movement of the electronic device 101, based on location information of the electronic device 101, through the GNSS communication module 210. The processor 120 may determine whether a user of the electronic device 101 moves by foot or moves by car, together with the electronic device 101, based on a location or velocity of the electronic device 101. In response to identifying that the processor 120 can calibrate a sensor (e.g., the direction sensor 220) of the electronic device 101 or second azimuth information thereof, the processor 120 may identify the movement of the electronic device 101.

In step 430, the processor 120 may identify whether the movement of the electronic device 101 corresponds to a certain movement. The processor 120 may identify whether the electronic device 101 moves at a certain velocity (e.g., about 10 km/h) or more.

Figure 5:
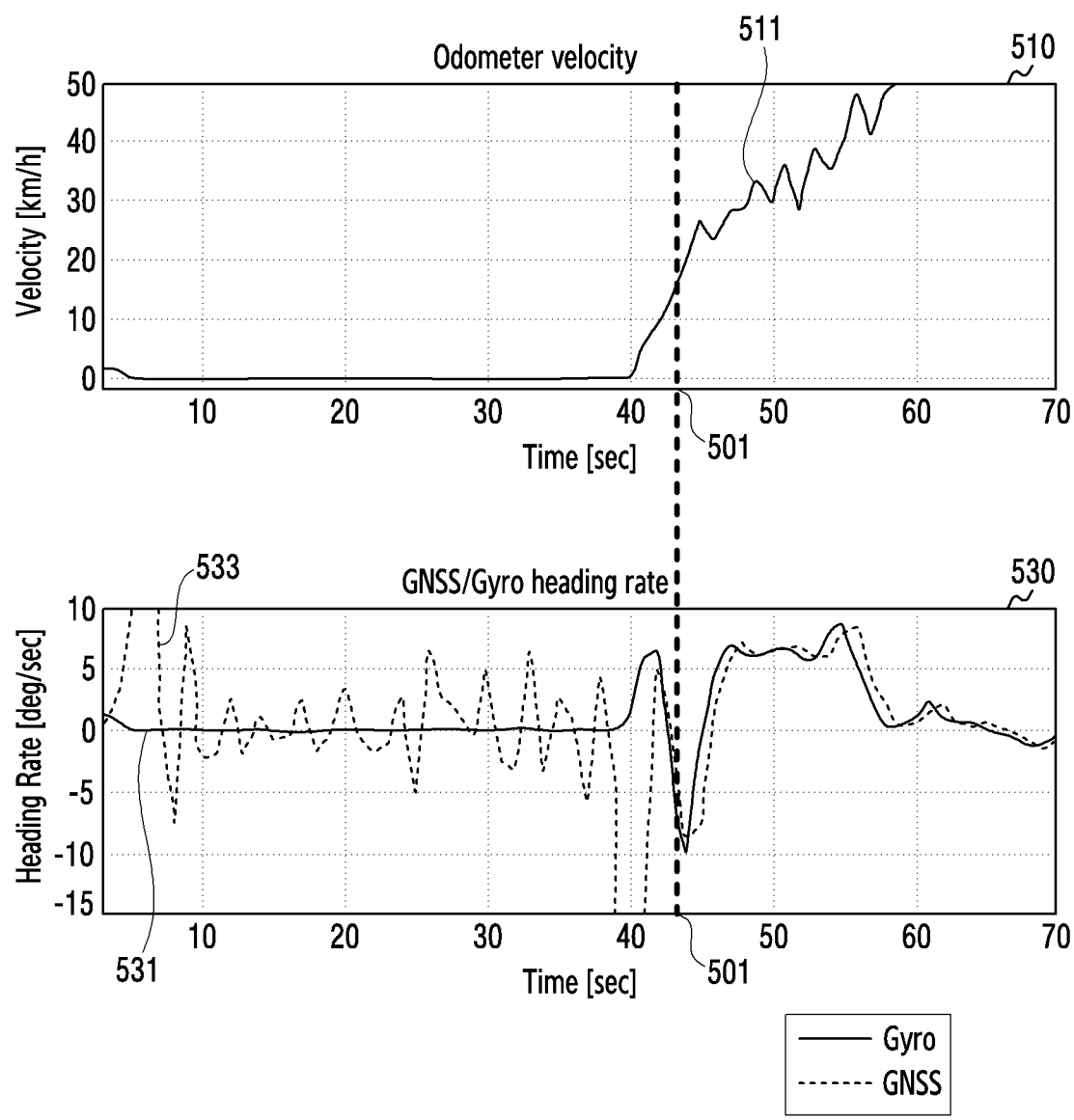
FIG. 5 are diagrams of a relationship between a velocity of an electronic device and an azimuth of the electronic device identified through a GNSS communication module according to an embodiment.

FIG. 5 are diagrams of a relationship between a velocity of the electronic device 101 and an azimuth of the electronic device 101 identified through the GNSS communication module 210 according to an embodiment.

Referring to FIG. 5, an x axis of a first graph 510 may correspond to time. The unit of the x axis of the first graph 510 may be seconds (sec). A y axis of the first graph 510 may correspond to velocity. The unit of the y axis of the first graph 510 may be kilometers per hour (km/h). A first curve 511 of the first graph 510 may represent a velocity dependent on time of the electronic device 101. An x axis of a second graph 530 may correspond to a time. The unit of the x axis of the second graph 530 may be seconds (sec). A y axis of the second graph 530 may correspond to a variation rate of an azimuth angle. The unit of the y axis of the second graph 530 may be degree/second (deg/sec). A second curve 531 of the second graph 530 may correspond to a variation rate of an azimuth angle dependent on time of the electronic device 101 identified through the GNSS communication module 210. A third curve 533 of the second graph 530 may correspond to a variation rate of an azimuth angle dependent on time of the electronic device 101 identified through the gyroscope 330. The variation rate of the azimuth angle dependent on time of the electronic device 101 identified through the gyroscope 330 is a value measured in a short term, and may be similar with an actual variation rate of an azimuth angle dependent on time of the electronic device 101 with almost no error.

At the first curve 511 of the first graph 510, the electronic device 101 may correspond to less than a certain velocity (e.g., about 10 km/h) before a timing 501. At the second graph 530, the variation rate of the azimuth angle dependent on time of the electronic device 101 identified through the GNSS communication module 210 may, before the timing 501, not be similar with the variation rate of the azimuth angle dependent on time of the electronic device 101 identified through the gyroscope 330. After the timing 501 of the first graph 510, the electronic device 101 may correspond to the certain velocity (e.g., about 10 km/h) or more. At the first curve 511 of the first graph 510, the electronic device 101 may, after the timing 501, correspond to the certain velocity (e.g., about 10 km/h) or more. At the second graph 530, the variation rate of the azimuth angle dependent on time of the electronic device 101 identified through the GNSS communication module 210 may be, after the timing 501, similar with the variation rate of the azimuth angle dependent on time of the electronic device 101 identified through the gyroscope 330. Accordingly, the processor 120 may identify whether it is the certain velocity (e.g., about 10 km/h) or more through the GNSS communication module 210 in order to identify exact first azimuth information of the electronic device 101.

The processor 120 may identify whether a direction of movement of the electronic device 101 is constant, based on location information of the electronic device 101 received from the GNSS communication module 210. For example, the processor 120 may identify whether the electronic device 101 moves in a straight line or a traffic line close thereto. For example, the processor 120 may identify whether the electronic device moves in a straight line direction within a certain azimuth range. For example, the processor 120 may identify whether the electronic device 101 executes a uniform motion in a certain direction. For example, the processor 120 may identify whether the electronic device 101 executes a curvilinear motion at a certain angular velocity.

Figure 6:
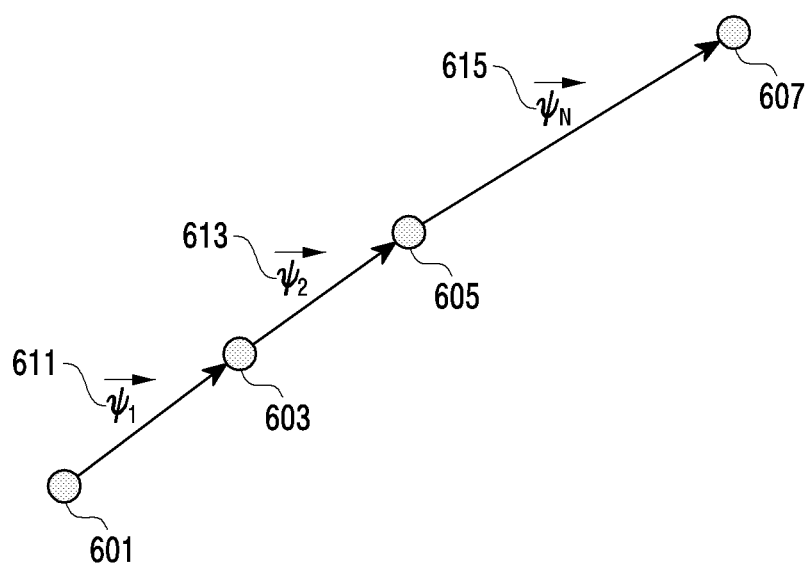
FIG. 6 is a diagram of a method for determining whether a direction of movement of an electronic device is constant according to an embodiment.

FIG. 6 is a diagram of a method for determining whether a direction of movement of the electronic device 101 is constant according to an embodiment.

Referring to FIG. 6, the processor 120 may receive location information of the electronic device 101 from the GNSS communication module 210. The processor 120 may generate a plurality of vectors through the received location information of the electronic device 101. For example, a first location 601 to a fourth location 607 may be location information of the electronic device 101 sequentially received from the GNSS communication module 210. The processor 120 may identify a first vector 611 to a third vector 615 by using the first location 601 to the fourth location 607. The first location 601 may be a starting point of the first vector 611, and the second location 603 may be an endpoint of the first vector 611. The second location 603 may be a starting point of the second vector 613, and the third location 605 may be an endpoint of the second vector 613. The third location 605 may be a starting point of the third vector 615, and the fourth location 607 may be an endpoint of the third vector 615. The processor 120 may generate a vector which has the first location 601 as a starting point and the third location 605 as an endpoint.

The processor 120 may store information about the first vector 611 to the third vector 615 in a memory, respectively. The processor 120 may obtain data statistics of the first vector 611 to third vector 615. The data statistics may include at least one of a mean, a variance, or a standard deviation. The processor 120 may determine whether a direction of movement of the electronic device 101 is constant through the obtained data statistics. For example, in response to a variance of the first vector 611 to the third vector 615 being less than or equal to a certain magnitude, the processor 120 may identify that the direction of movement of the electronic device 101 is constant.

In response to the electronic device 101 being coupled with a peripheral electronic device 102, the processor 120 may identify whether the movement of the electronic device 101 corresponds to a certain movement, based on information received through the peripheral electronic device. For example, in response to the electronic device 101 being coupled with a vehicle, the processor 120 may receive at least one of velocity information, odometer information, and/or handling information (or steering information) from the vehicle. The processor 120 may identify whether the movement of the electronic device 101 corresponds to a certain movement, based on the received information.

In step 450 in FIG. 4, in response to the movement of the electronic device 101 corresponding to the certain movement, the processor 120 may identify first azimuth information of the electronic device 101. The processor 120 may identify the first azimuth information of the electronic device 101, based on location information of the electronic device 101 received from the GNSS communication module 210. The first azimuth information may be obtained based on a movement direction of the electronic device 101. For example, the first azimuth information may include information about a front direction of a user of the electronic device 101. For example, the first azimuth information may include information about a direction that a certain surface (e.g., a surface in which a camera lens is disposed) of the electronic device 101 faces.

In step 470, the processor 120 may calibrate a sensor (e.g., the direction sensor 220) of the electronic device 101 or second azimuth information thereof. The processor 120 may obtain the second azimuth information through the sensor (e.g., the direction sensor 220) of the electronic device 101. The processor 120 may calibrate the second azimuth information, based on the first azimuth information. The processor 120 may calibrate the sensor of the electronic device 101, based on the first azimuth information.

Figure 7:
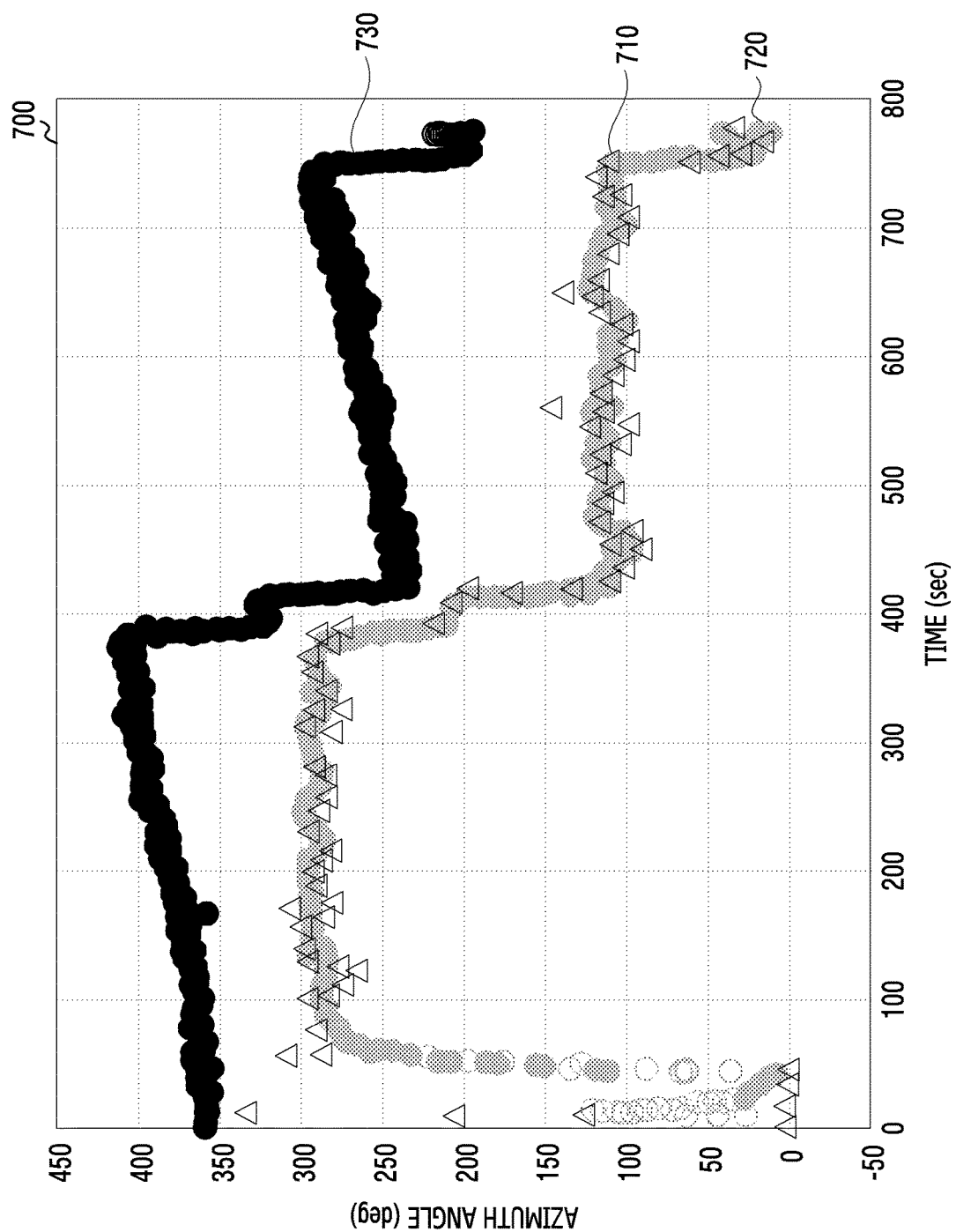
FIG. 7 is a diagram of an error of second azimuth information according to an embodiment.

FIG. 7 is a diagram representing an error of second azimuth information according to an embodiment.

Referring to FIG. 7, an x axis of graph 700 may correspond to time. The unit of the x axis of the graph 700 may be seconds (sec). A y axis of the graph 700 may correspond to an azimuth angle. The unit of the y axis of the graph 700 may be degrees (deg). A curve 710 may represent a change of an actual azimuth angle dependent on time of the electronic device 101. A curve 720 may represent a change of an azimuth angle (e.g., the first azimuth information) dependent on time of the electronic device 101 which is obtained based on location information received through the GNSS communication module 210. A curve 730 may represent a change of an azimuth angle (e.g., the second azimuth information) dependent on time of the electronic device 101 which is obtained through the sensor 220. The curve 720 may represent that the azimuth angle (e.g., the first azimuth information) dependent on time of the electronic device 101 which is obtained based on location information received through the GNSS communication module 210 is similar with the actual azimuth angle dependent on time of the electronic device 101. The curve 730 may represent that the azimuth angle (e.g., the second azimuth information) dependent on time of the electronic device 101 obtained through the sensor generates an error with a criterion of the actual azimuth angle dependent on time of the electronic device 101. The processor 120 may calibrate the error of the azimuth angle (e.g., the second azimuth information) dependent on time of the electronic device 101 obtained through the sensor, based on the azimuth angle (e.g., the first azimuth information) dependent on time of the electronic device 101 obtained through the GNSS communication module 210.

Figure 8:
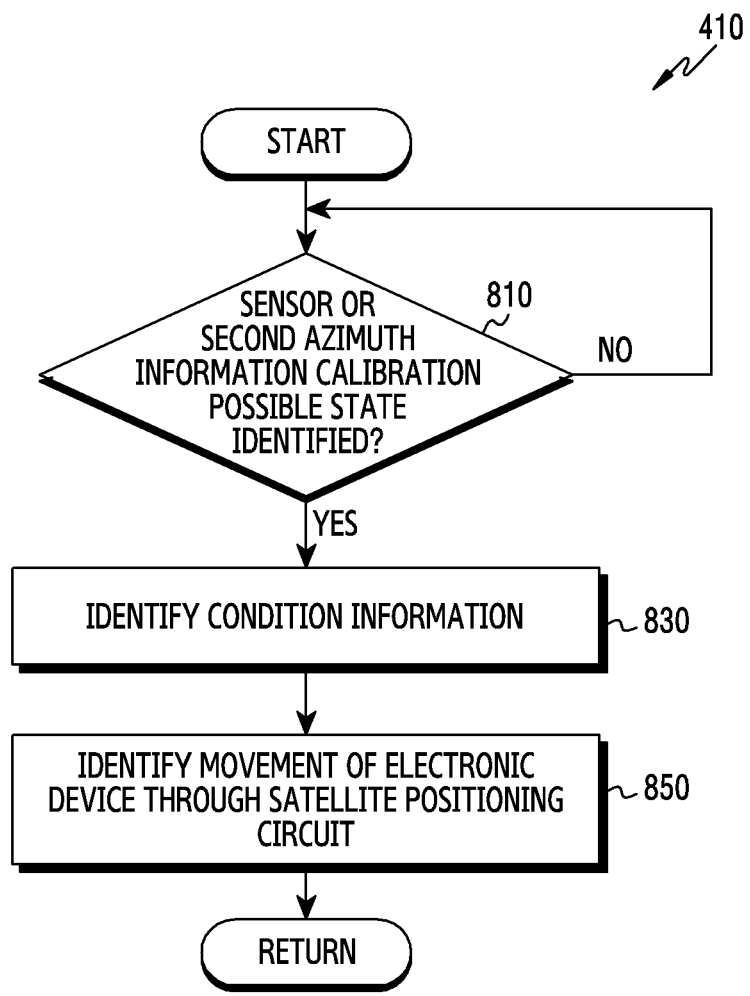
FIG. 8 is a flowchart of a method of identifying a movement of an electronic device according to an embodiment.

FIG. 8 is a flowchart of a method of identifying movement of the electronic device 101 according to an embodiment. Steps 810, 830, and 850 may relate to step 410 of FIG. 4.

Referring to FIG. 8, in step 810, the processor 120 may identify whether a sensor (e.g., the direction sensor 220) of the electronic device 101 or second azimuth information (e.g., the second azimuth information) thereof is in a calibration possible state. The processor 120 may identify whether the processor 120 can receive location information of the electronic device 101 through the GNSS communication module 210. For example, the processor 120 may identify whether the electronic device 101 is located in a shadow area in which a GNSS signal does not reach the electronic device 101. The processor 120 may identify whether the electronic device 101 is in a fixed state through the direction sensor 220. In response to the electronic device 101 being in the fixed state, the processor 120 may obtain second azimuth information of the electronic device 101 whose accuracy is high through the direction sensor 220 of the electronic device 101. For example, the processor 120 may obtain posture information of the electronic device 101 through a gyroscope of the electronic device 101, an acceleration sensor thereof, or a geomagnetic sensor thereof. The processor 120 may identify an inclination of the electronic device 101, lying or non-lying, and/or movement or non-movement through the acceleration sensor. The processor 120 may identify the rotation or non-rotation of the electronic device 101 through the gyroscope. The processor 120 may identify an azimuth of the electronic device 101 through the geomagnetic sensor. The processor 120 may obtain posture information of the electronic device 101 through information obtained through the gyroscope, the acceleration sensor or the geomagnetic sensor, and may identify whether the electronic device 101 maintains a certain posture through the posture information.

In step 830, the processor 120 may determine condition information of the electronic device 101. The processor 120 may identify whether the electronic device 101 is located within a running vehicle. For example, the processor 120 may identify whether the electronic device 101 is located within the running vehicle, based on a location of the electronic device 101 and a moving velocity thereof. In response to the moving velocity of the electronic device 101 being greater than or equal to a certain velocity (e.g., about 40 km/h), and a location of the electronic device 101 corresponding to a roadway, the processor 120 may identify that the electronic device 101 is within the running vehicle.

In response to the electronic device 101 being coupled with a peripheral electronic device 102, the processor 120 may identify condition information, based on information received through the peripheral electronic device. For example, the processor 120 may receive, from the vehicle, information that the electronic device 101 is coupled with a vehicle and the vehicle is running. In this case, the processor 120 may identify that the electronic device 101 is within the running vehicle.

The processor 120 may identify whether a user of the electronic device 101 walks or runs with the electronic device 101 in hand. The processor 120 may identify whether a virtual reality application is being executed in the electronic device 101. On the basis of a life pattern of the user of the electronic device 101, the processor 120 may identify a state of the user. For example, the processor 120 may identify that the user of the electronic device 101 is running. The processor 120 may identify that the user of the electronic device 101 is running for the purpose of exercise, based on the user of the electronic device 101 periodically running in the evening.

In step 850, the processor 120 may identify the movement of the electronic device 101 through a satellite positioning circuit. The processor 120 may identify the movement of the electronic device 101, based on the condition information through the GNSS communication module 210.

Figure 9:
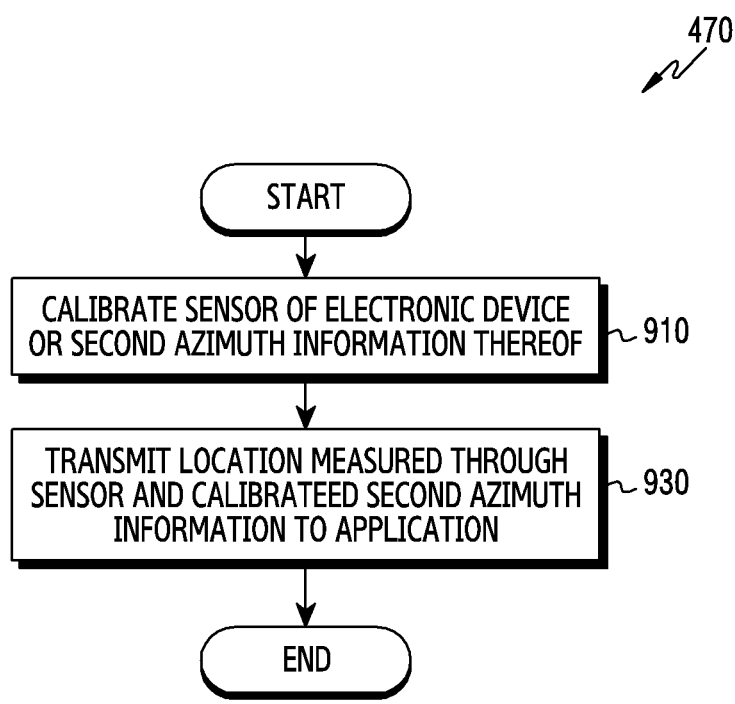
FIG. 9 is a flowchart of a method of calibrating a sensor of an electronic device or second azimuth information thereof according to an embodiment.

FIG. 9 is a flowchart of a method of calibrating a sensor of the electronic device 101 or second azimuth information thereof according to an embodiment. Steps 910 and 930 may relate to step 470 of FIG. 4.

Referring to FIG. 9, in step 910, the processor 120 may calibrate a sensor (e.g., the direction sensor 220) of the electronic device 101 or second azimuth information (e.g., the second azimuth information) thereof. The processor 120 may calibrate the second azimuth information, based on first azimuth information obtained through the GNSS communication module 210. For example, the processor 120 may calibrate the second azimuth information through a method of determining a deviation of the second azimuth information from the first azimuth information and compensating the deviation for the second azimuth information.

In step 930, the processor 120 may transmit (or provide) a location of the electronic device 101 measured through the sensor and the calibrated second azimuth information, to a related application. The processor 120 may transmit (or provide) location information of the electronic device 101 measured through the GNSS communication module 210 of the electronic device 101 and the calibrated second azimuth information, to the related application. The processor 120 may display the location information of the electronic device 101 and the calibrated second azimuth information on a display of the electronic device 101 by a graphic user interface (GUI) through the related application, to provide the same to a user of the electronic device 101. The processor 120 may output the location information of the electronic device 101 and the calibrated second azimuth information by a sound or vibration (or haptic), to provide the same to the user of the electronic device 101.

The processor 120 may provide the location information of the electronic device 101 and the calibrated second azimuth information, to a map application. The processor 120 may represent where the user of the electronic device 101 is located, and/or in which direction the user is seeing on the display device 160 of the electronic device 101 through the map application.

The processor 120 may provide the location information of the electronic device 101 and the calibrated second azimuth information, to an exercise application (or a health care application). The processor 120 may represent information including a movement distance, a velocity, a calories consumption amount, and/or the number of walks on the display device 160 of the electronic device 101 through the exercise application.

The processor 120 may provide a location measured through the sensor of the electronic device 101 and calibrated second azimuth information, to an augmented reality application. The processor 120 may determine a location of the user of the electronic device 101 and a sight-line direction of the user through the augmented reality application and provide content related to this to the user. For example, the processor 120 may identify that the user of the electronic device 101 sees a coffee shop and enters the coffee shop through the location measured through the sensor and the calibrated second azimuth information. The processor 120 may provide information about a coupon usable in the coffee shop and/or information about a discount card usable in the coffee shop, to the user. The processor 120 may provide the information to the user through a speaker or a display.

Figure 10:
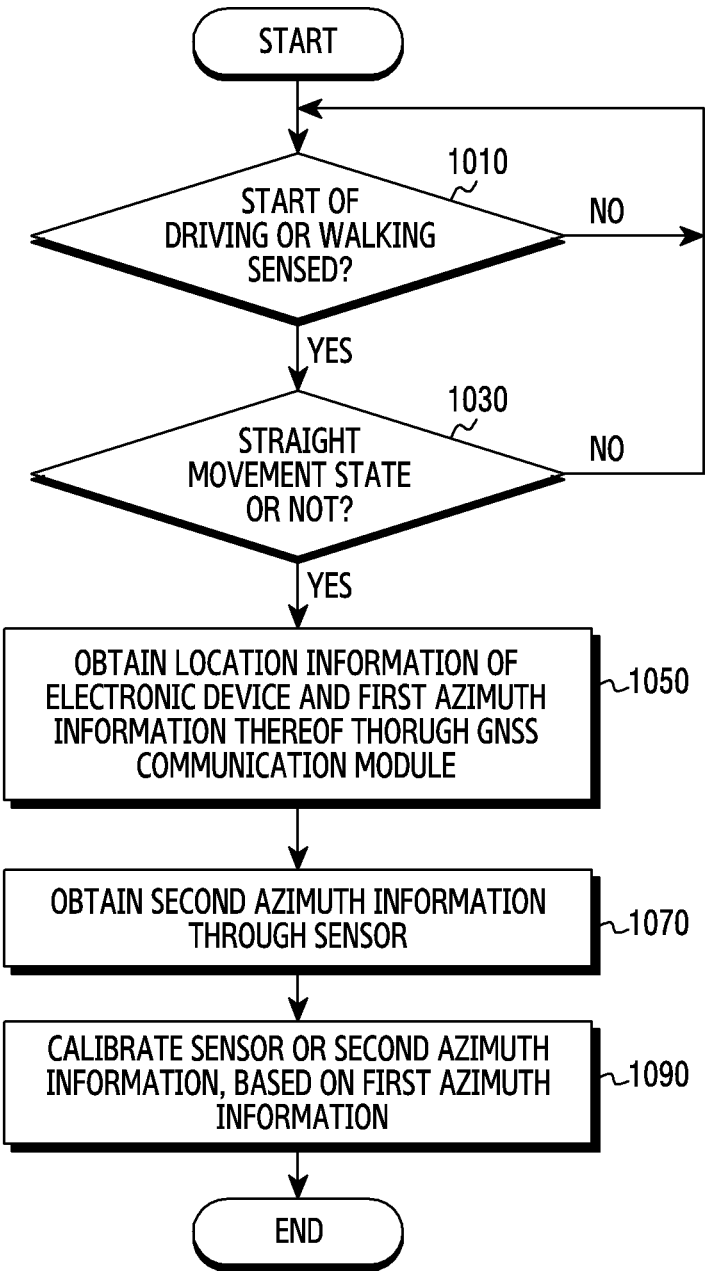
FIG. 10 is a flowchart of a method of calibrating a sensor of an electronic device or second azimuth information thereof in course of driving or walking according to an embodiment.

FIG. 10 is a flowchart of a method of calibrating a sensor of the electronic device 101 or second azimuth information thereof in course of driving or walking according to an embodiment.

Referring to FIG. 10, in step 1010, the processor 120 may sense whether a user of the electronic device 101 begins driving or walking. The processor 120 may sense whether the user of the electronic device 101 begins driving or walking based on a location or velocity of the electronic device 101. For example, the processor 120 may identify whether a location of the electronic device 101 is a roadway, and a velocity of the electronic device 101 is greater than or equal to a certain velocity (e.g., about 40 km/h). The processor 120 may identify that the user of the electronic device 101 is driving. For example, the processor 120 may identify whether the location of the electronic device 101 is a sidewalk, and the velocity of the electronic device 101 is less than or equal to a certain velocity (e.g., about 4 km/h). The processor 120 may identify that the user of the electronic device 101 is walking.

The processor 120 may sense whether the user of the electronic device 101 begins driving or walking, through an application which is being executed in the electronic device 101. For example, the processor 120 may identify whether a navigation application is being executed. In response to the navigation application being in execution, the processor 120 may identify that the user of the electronic device 101 is driving. For example, in response to an augmented reality application being in execution, the processor 120 may identify screen information of the augmented reality application. The processor 120 may identify that the user of the electronic device 101 is walking, based on the screen information identified through the augmented reality application.

In response to the user of the electronic device 101 driving, the processor 120 may additionally identify whether the electronic device 101 has been mounted in a vehicle.

In response to the user of the electronic device 101 walking, the processor 120 may additionally identify whether the electronic device 101 is in a state of being fixed through the user's body.

In step 1030, in response to the user of the electronic device 101 driving or walking, the processor 120 may identify whether the electronic device 101 is moving in a straight line or a traffic line close to the straight line. The processor 120 may receive location information of the electronic device 101 from the GNSS communication module 210.

Figure 11:
FIG. 11 is a diagram of a method for determining whether an electronic device drives in a straight line or a traffic line close to the straight line while a user of the electronic device walks according an embodiment.

FIG. 11 is a diagram of a method for determining whether the electronic device 101 drives in a straight line or a traffic line close to the straight line while the user of the electronic device 101 walks according to an embodiment.

Referring to FIG. 11, the processor 120 may receive information about a first location 1101 of the electronic device 101 to a fourth location 1107 thereof through the GNSS communication module 210. The first location 1101 to the fourth location 1107 may be locations of the electronic device 101 dependent on time. The processor 120 may obtain a plurality of vectors, based on the first location 1101 to the fourth location 1107. The processor 120 may identify whether the electronic device 101 moves in the straight line or the traffic line close to the straight line through the plurality of vectors.

In response to the user of the electronic device 101 walking, the processor 120 may additionally identify whether the processor 120 can receive a precise location of the electronic device 101 through the GNSS communication module 210. For example, the processor 120 may identify whether the GNSS communication module 210 can simultaneously use an L1 band (e.g., about 1574 to about 1576 MHz) and an L5 band (e.g., about 1166 to about 1187 MHz). In response to the GNSS communication module 210 simultaneously using the L1 band and the L5 band, the processor 120 may identify that the processor 120 can receive the precise location of the electronic device 101 from the GNSS communication module 210. In response to being able to receive the precise location of the electronic device 110 through the GNSS communication module 210, the processor 120 may set low a velocity required for identifying whether the electronic device 101 moves in the straight line or the traffic line close to the straight line. In response to being able to receive the precise location of the electronic device 101 through the GNSS communication module 210, even in response to the user of the electronic device 101 walking (even in response to the velocity being low), the processor 120 may identify whether the electronic device 101 moves in the straight line or the traffic line close to the straight line. In this operation, for example, a description has been provided for a case where the operation of identifying whether the processor 120 can receive the precise location of the electronic device 101 through the GNSS communication module 210 while the user is walking, but the present disclosure is not intended to be limited to this, but may be applied to a case where the user of the electronic device 101 is driving.

In step 1050 in FIG. 10, the processor 120 may obtain location information of the electronic device 101 and first azimuth information thereof through the GNSS communication module 210. The processor 120 may obtain the first azimuth information, based on the location information of the electronic device 101 received through the GNSS communication module 210. For example, the first azimuth information may be obtained based on a mean of the vectors obtained through the first location 1101 to fourth location 1107 of FIG. 11. The processor 120 may identify that the electronic device 101 is moving at 45 degrees (northeast) in a clockwise direction with a criterion of the magnetic north, based on the first location 1101 to the fourth location 1107. The processor 120 may identify that an azimuth of the electronic device 101 is 45 degrees in the clockwise direction with a criterion of the north. The first azimuth information may include information representing 45 degrees in the clockwise direction with a criterion of the north.

In step 1070, the processor 120 may obtain second azimuth information through the direction sensor 220 of the electronic device 101. The processor 120 may determine an RV by using information received from the acceleration sensor, gyroscope and geomagnetic sensor of the electronic device 101. The processor 120 may identify the second azimuth information of the electronic device 101 with a criterion of the magnetic north, based on the RV. For example, an azimuth of the electronic device 101 may be identified to be 45 degrees in the clockwise direction with a criterion of the magnetic north. The second azimuth information may include information representing 40 degrees in the clockwise direction with a criterion of the north. The processor 120 may determine a GRV by using information received from the acceleration sensor and/or gyroscope of the electronic device 101. The processor 120 may identify the second azimuth information of the electronic device 101 with a criterion of a reference direction of the electronic device 101, based on the GRV. The reference direction of the electronic device 101 may correspond to an azimuth of the electronic device 101 before a certain time (e.g., about five minutes).

In step 1090, the processor 120 may calibrate the sensor of the electronic device 101 or the second azimuth information thereof, based on the first azimuth information. The processor 120 may calibrate the direction sensor 220 of the electronic device 101 or the second azimuth information thereof with a criterion of the first azimuth information obtained through the GNSS communication module 210. The processor 120 may calibrate the second azimuth information of the electronic device 101 which is identified based on the GRV with a criterion of the first azimuth information. The processor 120 may calibrate the second azimuth information of the electronic device 101 which is identified based on the RV with a criterion of the first azimuth information. For example, in response to the first azimuth information being information representing 45 degrees in a clockwise direction with a criterion of the north, and the second azimuth information being information representing 40 degrees in the clockwise direction with a criterion of the north, the processor 120 may calibrate the second azimuth information by the information representing the 45 degrees in the clockwise direction with a criterion of the north.

A description of FIG. 10 is provided in which the processor 120 obtains the second azimuth information through the sensor and then calibrates the second azimuth information based on the first azimuth information, but the present disclosure is not intended to be limited to this. The processor 120 may calibrate the direction sensor 220 of the electronic device 101, based on the first azimuth information. The processor 120 may obtain the second azimuth information by using the calibrated sensor of the electronic device 101. The second azimuth information obtained using the calibrated sensor of the electronic device 101 may be the same or similar with the second azimuth information calibrated based on the first azimuth information.

Figure 12:
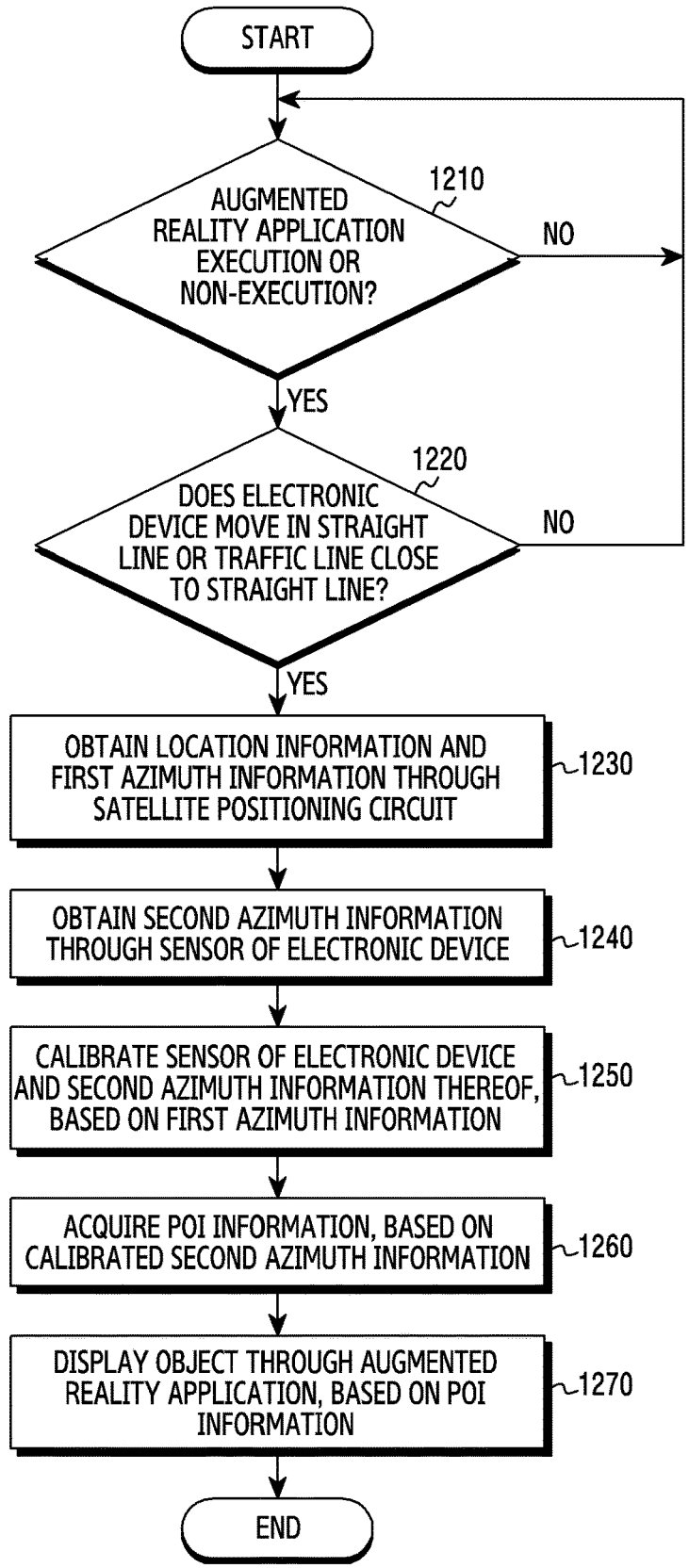
FIG. 12 is a flowchart of a method of calibrating a sensor of an electronic device or second azimuth information thereof by using an augmented reality application in an electronic device according to an embodiment.

FIG. 12 is a flowchart of a method of calibrating a sensor of the electronic device 101 or second azimuth information thereof by using an augmented reality application in the electronic device 101 according to an embodiment.

Referring to FIG. 12, in step 1210, the processor 120 may identify whether the augmented reality application is executed in the electronic device 101. The processor 120 may display an icon representing augmented reality content through the display device 160 or provide a menu accessible to the augmented reality content.

The processor 120 may identify whether the electronic device 101 maintains a fixed posture together with whether the augmented reality application is executed in the electronic device 101. In response to the electronic device 101 holding the fixed posture, the processor 120 may obtain the second azimuth information of the electronic device 101 whose accuracy is high through the direction sensor 220 of the electronic device 101. For example, the processor 120 may identify whether the user of the electronic device 101 holds the posture of the electronic device 101 with hand through the direction sensor 220 of the electronic device 101. For example, the processor 120 may identify whether the electronic device 101 is in a state of being fixed to a vehicle through the sensor of the electronic device 101.

In step 1220, the processor 120 may identify whether the electronic device 101 moves in a straight line or a traffic line close to the straight line. The processor 120 may identify whether the electronic device 101 moves in the straight line or the traffic line close to the straight line based on location information of the electronic device 101 received from the GNSS communication module 210. The processor 120 may identify whether the electronic device 101 moves in the straight line or the traffic line close to the straight line, based on information received through the augmented reality application executed in the electronic device 101. For example, the processor 120 may obtain an input image through the camera module 180. The processor 120 may identify whether the electronic device 101 moves in the straight line or the traffic line close to the straight line, based on a change of peripheral things within the input image. For example, in conditions where the user of the electronic device 101 is driving through a car, the processor 120 may obtain an input image through the camera module 180. The processor 120 may identify a lane in the input image. The processor 120 may identify whether the electronic device 101 moves in the straight line or the traffic line close to the straight line, based on the identified lane.

The processor 120 may identify whether the electronic device 101 moves at a certain velocity (e.g., about 1 km/h) or together in the straight line or the traffic line close to the straight line. For example, in response to the GNSS communication module using only an L1 band, the processor 120 may determine a first certain velocity (e.g., about 10 km/h). In response to the GNSS communication module 210 using the L1 band and an L5 band together, the processor 120 may determine a second certain velocity (e.g., about 1 km/h). In case where the GNSS communication module 210 uses the L1 band and the L5 band together, the accuracy of an estimated location of the electronic device 101 may be higher than in case of using only the L1 band. Accordingly, the second certain velocity may be less than the first certain velocity.

In step 1230, the processor 120 may obtain location information of the electronic device. 101 and first azimuth information thereof through the GNSS communication module 210. The processor 120 may provide the location information of the electronic device 101 and the first azimuth information thereof, to the user of the electronic device 101 through the augmented reality application. For example, the processor 120 may display a current location of the electronic device 101, a passed distance thereof or a direction thereof on an execution screen of the augmented reality application.

In step 1240, the processor 120 may obtain the second azimuth information through the direction sensor 220 of the electronic device 101. The processor 120 may obtain information about a posture of the electronic device 101 through the direction sensor 220. The processor 120 may obtain the second azimuth information, based on the information about the posture of the electronic device 101.

In step 1250, the processor 120 may calibrate the direction sensor 220 of the electronic device 101 or the second azimuth information thereof, based on the first azimuth information. The processor 120 may calibrate the sensor of the electronic device 101, based on the first azimuth information, wherein a driving error is not generated. The processor 120 may calibrate the second azimuth information by the first azimuth information.

In step 1260, the processor 120 may obtain a point of interest (POI), based on the calibrated second azimuth information. The processor 120 may identify a direction which the user of the electronic device 101 faces, based on the calibrated second azimuth information. The processor 120 may identify a kind of a subject received through the augmented reality application. The processor 120 may obtain the POI, based on the identified kind of the subject. The POI may include a landmark around the electronic device 101, a shop that the user of the electronic device 101 often visits or a thing.

Figure 13A:
FIGS. 13A and 13B are illustrations of a method of providing information related to a current location to a user of an electronic device in an augmented reality application according to an embodiment.
Figure 13B:
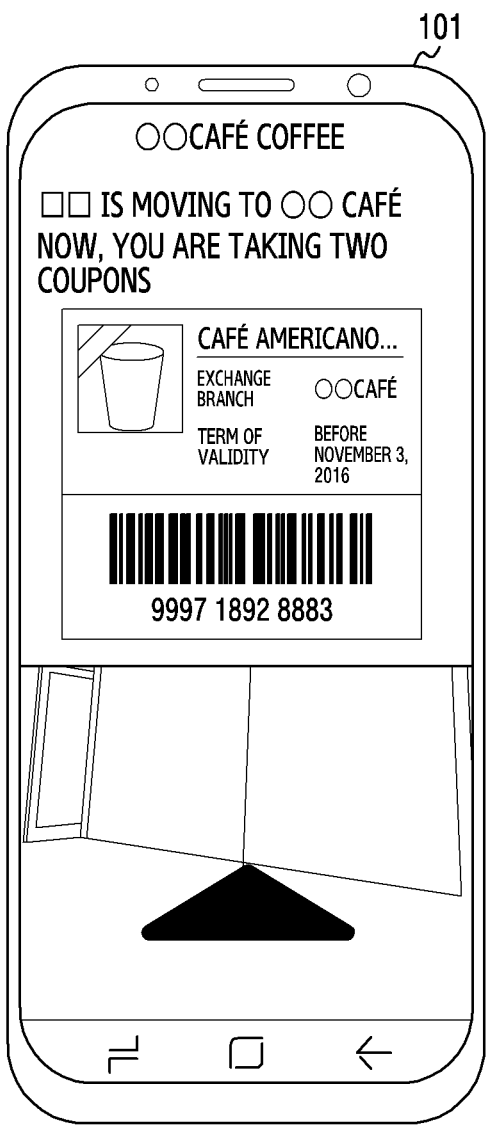

FIGS. 13A and 13B are illustrations of a method for providing information related to a current location to the user of the electronic device 101 in the augmented reality application according to an embodiment.

Referring to FIG. 13A, for example, the processor 120 may identify a signboard of a coffee shop through the calibrated second azimuth information and the augmented reality application. The processor 120 may identify that the user of the electronic device 101 accesses the coffee shop or café through the calibrated second azimuth information and the augmented reality application. The processor 120 may display information representing that the user of the electronic device 101 moves to the coffee shop or café through the augmented reality application.

In step 1270 of FIG. 12, the processor 120 may display an object related to the POI through the augmented reality application, based on the POI.

Referring to FIG. 13B, for example, the processor 120 may provide additional information (e.g., a usable coupon or discount card) related to the coffee shop through the augmented reality application, based on identifying that the user is moving to the coffee shop.

Figure 14:
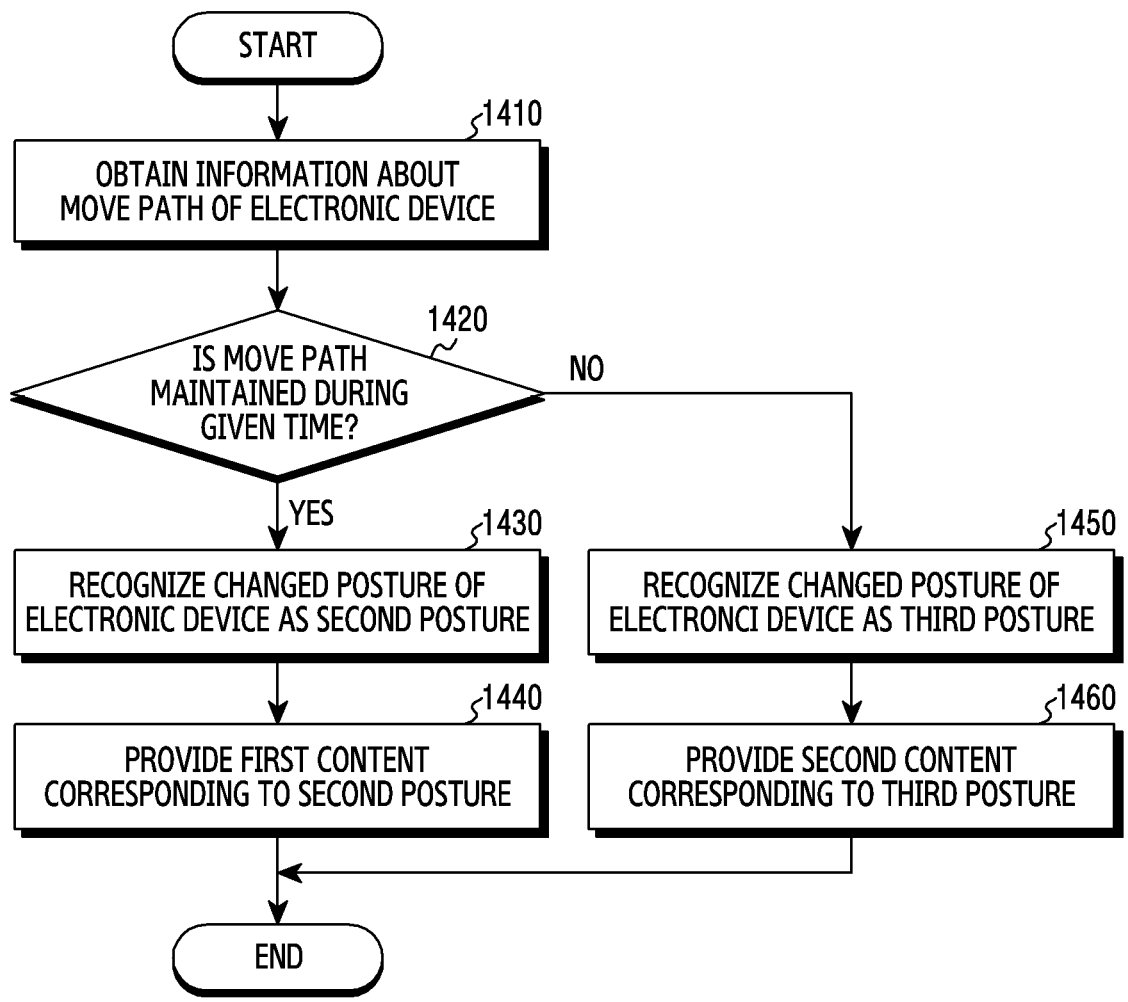
FIG. 14 is a flowchart of a method of providing content dependent on a posture of an electronic device according to an embodiment.

FIG. 14 is a flowchart of a method of providing content dependent on a posture of the electronic device 101 according to an embodiment.

Referring to FIG. 14, in step 1410, the processor 120 may obtain information about a move path of the electronic device 101 through the GNSS communication module 210 of the electronic device 101. The processor 120 may receive information about a location of the electronic device 101 from the GNSS communication module 210. The processor 120 may obtain the information about the move path of the electronic device 101, based on the information about the location of the electronic device 101. For example, the GNSS communication module 210 may obtain information about a location of the electronic device 101 from a plurality of satellites every certain time (e.g., about one second). The processor 120 may receive the information about the location of the electronic device 101 from the GNSS communication module 210. The processor 120 may obtain the information about the move path of the electronic device 101, based on the information about the location of the electronic device 101. The processor 120 may provide the information about the location of the electronic device 101 or the information about the move path to the user through the display device 160 (e.g., display) of the electronic device 101.

In step 1420, the processor 120 may identify whether the move path of the electronic device 101 is maintained for a certain time. The processor 120 may identify whether the move path is maintained for the certain time, based on the information about the location of the electronic device 101 received through the GNSS communication module 210. For example, the processor 120 may receive the location information dependent on time of the electronic device 101 from the GNSS communication module 210. The processor 120 may identify the move path of the electronic device 101, based on the location information dependent on time. The processor 120 may identify whether the move path of the electronic device 101 is maintained for the certain time. The processor 120 may identify whether the electronic device 101 moves with a certain angular velocity in a curved line through the GNSS communication module 210.

In step 1430, in response to the move path of the electronic device 101 being maintained for the certain time, the processor 120 may identify that a posture of the electronic device 101 is changed and recognize the changed posture of the electronic device 101 as a second posture. In response to the move path of the electronic device 101 being maintained for the certain time, the processor 120 may obtain first azimuth information, based on the location information of the electronic device 101 obtained through the GNSS communication module. The first azimuth information may include a movement direction of the electronic device 101. The processor 120 may calibrate the direction sensor 220 of the electronic device 101, based on the first azimuth information. The processor 120 may recognize the changed posture of the electronic device 101 as the second posture through the calibrated sensor. The second posture may represent an actual posture of the electronic device 101.

In step 1440, the processor 120 may provide a first content corresponding to the second posture. The first content may include a POI.

The processor 120 may identify a direction which the user of the electronic device 101 faces, based on the second posture. The processor 120 may provide the first content, based on the direction which the user of the electronic device 101 faces. For example, the processor 120 may identify, based on the second posture, a shop that is in the direction which the user of the electronic device 101 faces. The processor 120 may provide the user with content related to the identified shop. For example, the content related to the identified shop may include information about a coupon usable in the identified shop, a discount card, sale goods, and/or a price.

In response to the posture of the electronic device 101 being recognized as the second posture, the processor 120 may identify a first subject, based on information received through the camera module 180. The first subject may be located in a direction which the user of the electronic device 101 faces. The first subject may be located near the electronic device 101. The processor 120 may provide the first content related to the first subject to the user of the electronic device 101. The processor 120 may provide the first content through the display device 160 or the audio module 170. For example, the processor 120 may identify that the electronic device 101 is rotated from a current posture to the left by using the calibrated sensor. The processor 120 may identify a wine bottle through the camera module 180 of the electronic device 101. The processor 120 may receive information about the kind of a wine, a country of origin, a production year, etc. from the server 108. The processor 120 may display the received information about the kind of the wine, the country of origin, the production year, etc. on the display of the electronic device 101. For example, the processor 120 may identify that the electronic device 101 is rotated from a current posture to the left. The processor 120 may identify a document written in a foreign language through the camera module 180 of the electronic device 101. The processor 120 may translate the document written in the foreign language into Korean, and display the document on the display of the electronic device 101.

In step 1450, in response to the move path of the electronic device 101 not being maintained for the certain time (in response to the move path being changed), the processor 120 may recognize the changed posture of the electronic device 101 as a third posture. In response to the move path not being maintained for the certain time, the processor 120 may fail to obtain the first azimuth information, based on the location information of the electronic device 101 obtained through the GNSS communication module. The processor 120 may recognize the changed posture of the electronic device 101 as the third posture through the non-calibrated sensor (e.g., the direction sensor 220). The third posture may not correspond to an actual posture of the electronic device 101.

In step 1460, the processor 120 may provide a second content corresponding to the third posture. The second content may include a POI.

The processor 120 may identify a direction that is different from a direction which the user of the electronic device 101 faces, based on the third posture. The processor 120 may provide a second content, based on the different direction of the electronic device 101. For example, the processor 120 may identify a shop that is in the direction different from the direction which the user of the electronic device 101 faces, based on the third posture. The processor 120 may provide the user with content related to the identified shop. The content related to the identified shop may include information about a coupon usable in the identified shop, a discount card, sale goods, and/or a price.

In response to the posture of the electronic device 101 being recognized as the third posture, the processor 120 may identify a second subject, based on received information through the camera module 180 of the electronic device 101. The second subject may be located in a direction different from the direction which the user of the electronic device 101 faces. The second subject may be located near the electronic device 101. The processor 120 may provide a second content related to the second subject to the user of the electronic device 101. The processor 120 may provide the second content through the display device 160 or the audio module 170. For example, the processor 120 may identify that the electronic device 101 is rotated from a current posture to the left. The processor 120 may identify food through the camera module 180 of the electronic device 101. The processor 120 may display calorie information of food, ingredient information, etc. on the display of the electronic device 101. For example, the processor 120 may identify that the electronic device 101 is rotated from a current posture to the left. The processor 120 may identify a signboard of a building written in a foreign language through the camera module 180 of the electronic device 101. The processor 120 may display shop information and/or a comment on the display of the electronic device, based on information about the signboard of the building written in the foreign language.

According to an embodiment of the present disclosure, a method of an electronic device may include identifying a movement of the electronic device by using a plurality of location information received through a satellite positioning circuit of the electronic device, and identifying first azimuth information corresponding to the movement of the electronic device, based at least on determining that the movement of the electronic device corresponds to a designated movement, and calibrating second azimuth information obtained using at least one sensor for sensing an azimuth or movement of the electronic device or the at least one sensor, based at least on the first azimuth information.

The method may further include identifying whether a velocity of the movement of the electronic device is greater than or equal to a designated velocity.

The designated velocity may be identified based on a frequency that is used through the satellite positioning circuit.

Identifying the first azimuth information corresponding to the movement of the electronic device may include obtaining a plurality of vectors, based on the plurality of location information received through the satellite positioning circuit, and identifying the first azimuth information, based on a mean or dispersion of the plurality of vectors.

The method may further include identifying the second azimuth information in a state in which the at least one sensor is calibrated, and providing content corresponding to the second azimuth information.

While a detailed description of the present disclosure is provided for a concrete embodiment, various modifications are available without departing from the scope of the present disclosure. Therefore, the scope of the present disclosure is not intended to be limited to and defined by a disclosed embodiment but should is defined by the scope of appended claims and their equivalents.

What is claimed is:
1. An electronic device, comprising:
a satellite positioning circuit;
at least one sensor for sensing an azimuth or movement of the electronic device; and
a processor configured to:
control detection of the movement of the electronic device by using a plurality of location information received through the satellite positioning circuit,
obtain first azimuth information corresponding to the movement of the electronic device, based at least on determining that the movement of the electronic device corresponds to a predetermined movement,
obtain information about a posture of the electronic device by using information received from the at least one sensor,
obtain second azimuth information based on the information about the posture of the electronic device, and
calibrate the second azimuth information based at least on the first azimuth information.

2. The electronic device of claim 1, wherein the processor is further configured to determine whether a velocity of the movement of the electronic device is greater than or equal to a predetermined velocity.

3. The electronic device of claim 2, wherein the predetermined velocity is determined based on a frequency that is used through the satellite positioning circuit.

4. The electronic device of claim 1, wherein the processor is further configured to:
 obtain a point of interest (POI) based on the plurality of location information and the calibrated second azimuth information, and
 provide control output of content related to the POI.

5. The electronic device of claim 1, wherein the processor is further configured to determine whether the electronic device is in a fixed state.

6. The electronic device of claim 1, wherein the processor is further configured to:
 obtain a plurality of vectors, based on the plurality of location information received through the satellite positioning circuit, and
 obtain the first azimuth information, based on a mean or dispersion of the plurality of vectors.

7. The electronic device of claim 1, wherein the at least one sensor comprises at least one of an acceleration sensor, a gyroscope, and a geomagnetic sensor.

8. The electronic device of claim 1, wherein the processor is further configured to, in response to the processor detecting that the movement of the electronic device executes a rectilinear motion within a certain direction range, determine that the movement of the electronic device corresponds to the predetermined movement.

9. The electronic device of claim 1, wherein the processor is further configured to, in response to the processor detecting that the movement of the electronic device executes a curvilinear motion within a certain angular velocity, determine that the movement of the electronic device corresponds to the predetermined movement.

10. An electronic device, comprising:
 a satellite positioning circuit;
 at least one sensor configured to sense an azimuth or movement of the electronic device; and
 a processor configured to:
  control detection of the movement of the electronic device by using a plurality of location information received through the satellite positioning circuit,
  obtain first azimuth information corresponding to the movement of the electronic device, based at least on determining that the movement of the electronic device corresponds to a predetermined movement,
  calibrate the at least one sensor, based at least on the first azimuth information,
  obtain information about a posture of the electronic device by using information received from the calibrated at least one sensor, and
  obtain second azimuth information based on the information about the posture of the electronic device.

11. The electronic device of claim 10, wherein the processor is further configured to:
 obtain a plurality of vectors, based on the plurality of location information received through the satellite positioning circuit, and
 obtain the first azimuth information, based on a mean or dispersion of the plurality of vectors.

12. The electronic device of claim 10, wherein the processor is further configured to:
 obtain a point of interest (POI) based on the plurality of location information and the second azimuth information, and
 control output of content related to the POI.

13. The electronic device of claim 10, wherein the processor is further configured to:
 obtain information about a move path of the electronic device by using the satellite positioning circuit,
 in response to determining that the move path is maintained during a predetermined time and then determining that the posture of the electronic device is changed from a first posture within a predetermined period of time, recognize the posture of the electronic device changed from the first posture as a second posture, and control output of first content corresponding to the second posture, and
 in response to determining that the move path is changed during the predetermined time and then determining that the posture of the electronic device is changed from the first posture within the predetermined period of time, recognize the posture of the electronic device changed from the first posture as a third posture distinguished from the second posture, and control output of second content corresponding to the third posture.

14. The electronic device of claim 13, wherein the processor is further configured to:
 in response to detecting a first subject in the second posture, control output of the first content corresponding to the first subject, and
 in response to detecting a second subject in the third posture, control output of the second content corresponding to the second subject.

15. A method of an electronic device, the method comprising:
 detecting a movement of the electronic device by using a plurality of location information received through a satellite positioning circuit of the electronic device;
 obtaining first azimuth information corresponding to the movement of the electronic device, based at least on determining that the movement of the electronic device corresponds to a predetermined movement;
 obtaining information about a posture of the electronic device by using information received from at least one sensor of the electronic device;
 obtaining second azimuth information based on the information about the posture of the electronic device; and
 calibrating the second azimuth information or the at least one sensor, based at least on the first azimuth information.

16. The method of claim 15, further comprising determining whether a velocity of the movement of the electronic device is greater than or equal to a predetermined velocity.

17. The method of claim 16, wherein the predetermined velocity is determined based on a frequency that is used through the satellite positioning circuit.

18. The method of claim 15, wherein obtaining the first azimuth information corresponding to the movement of the electronic device comprises:
 obtaining a plurality of vectors, based on the plurality of location information received through the satellite positioning circuit; and
 obtaining the first azimuth information, based on a mean or dispersion of the plurality of vectors.

19. The method of claim 15, further comprising:
 obtaining a point of interest (POI) based on the plurality of location information and the calibrated second azimuth information; and
 outputting content related to the POI.

* * * * *